June 11, 1940.  A. BENNETT  2,203,977
AUTOMATIC TAPE-APPLYING MACHINE
Filed April 7, 1937  9 Sheets-Sheet 6
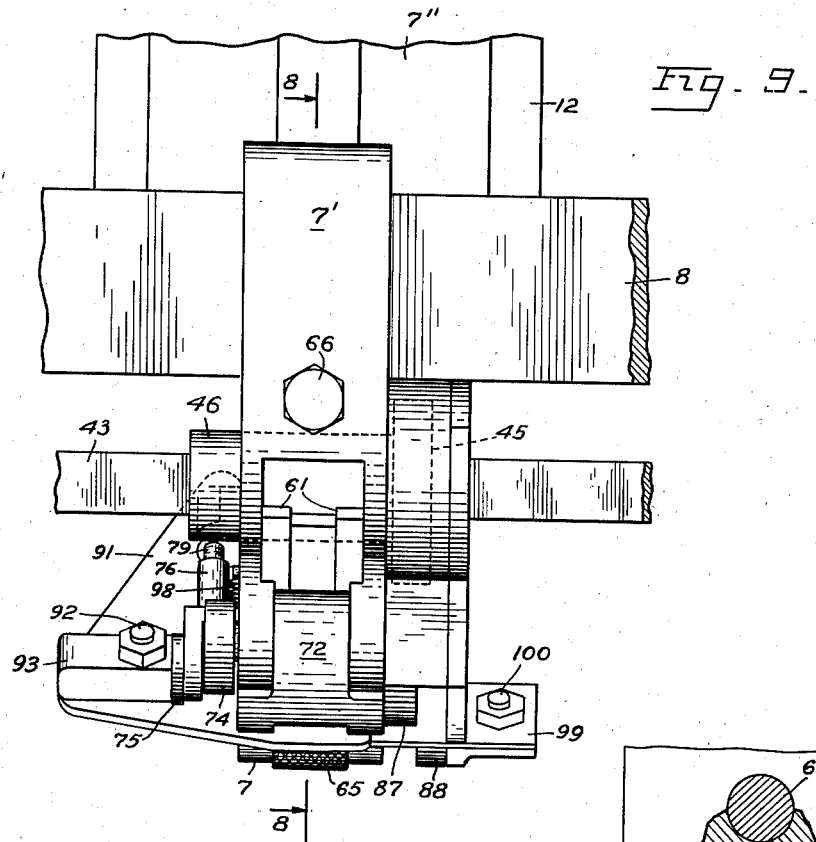
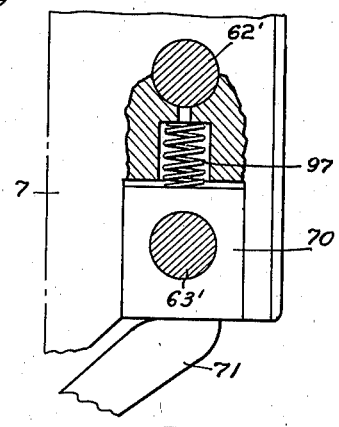
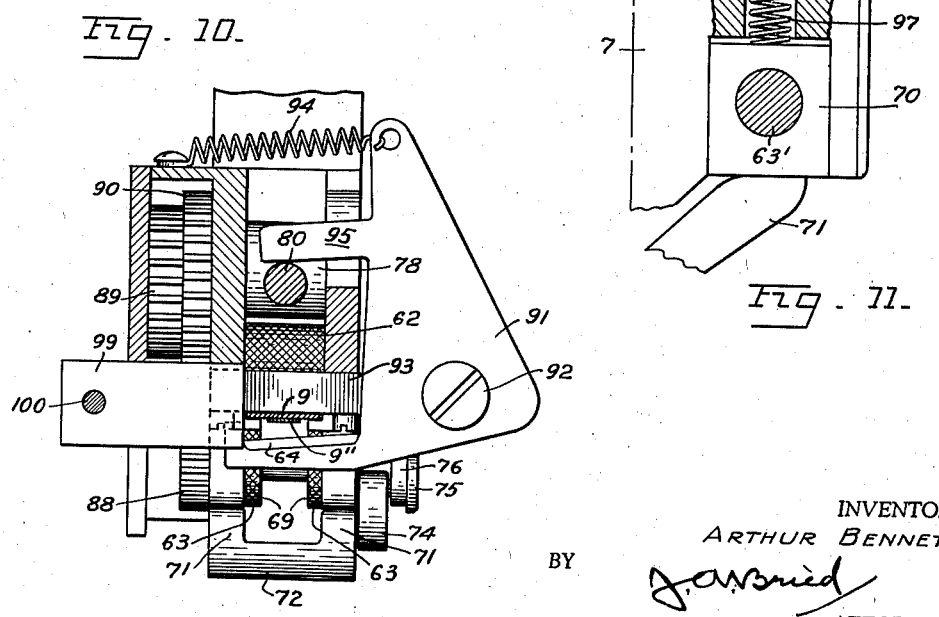
INVENTOR.
ARTHUR BENNETT
BY
ATTORNEY.

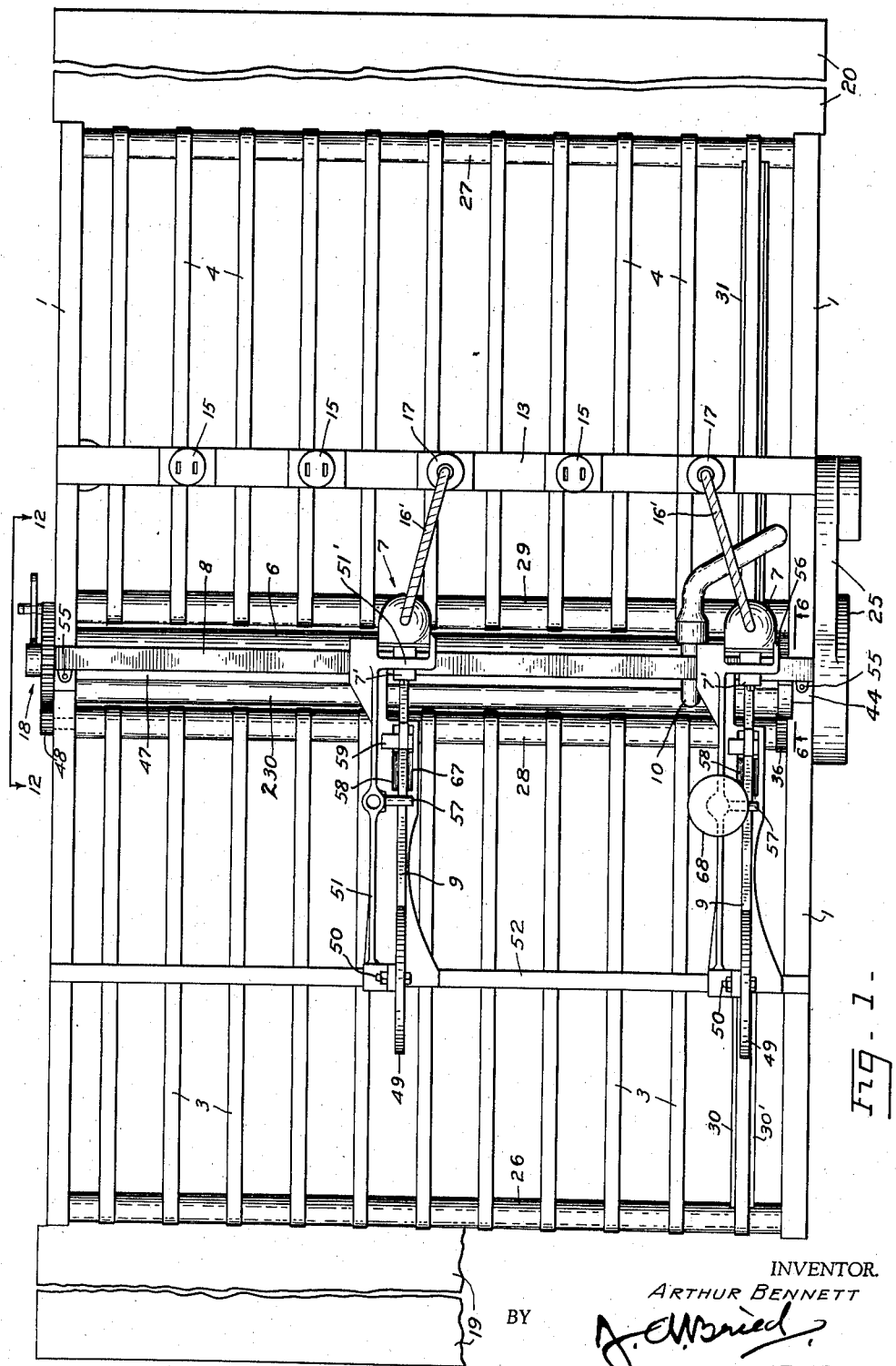

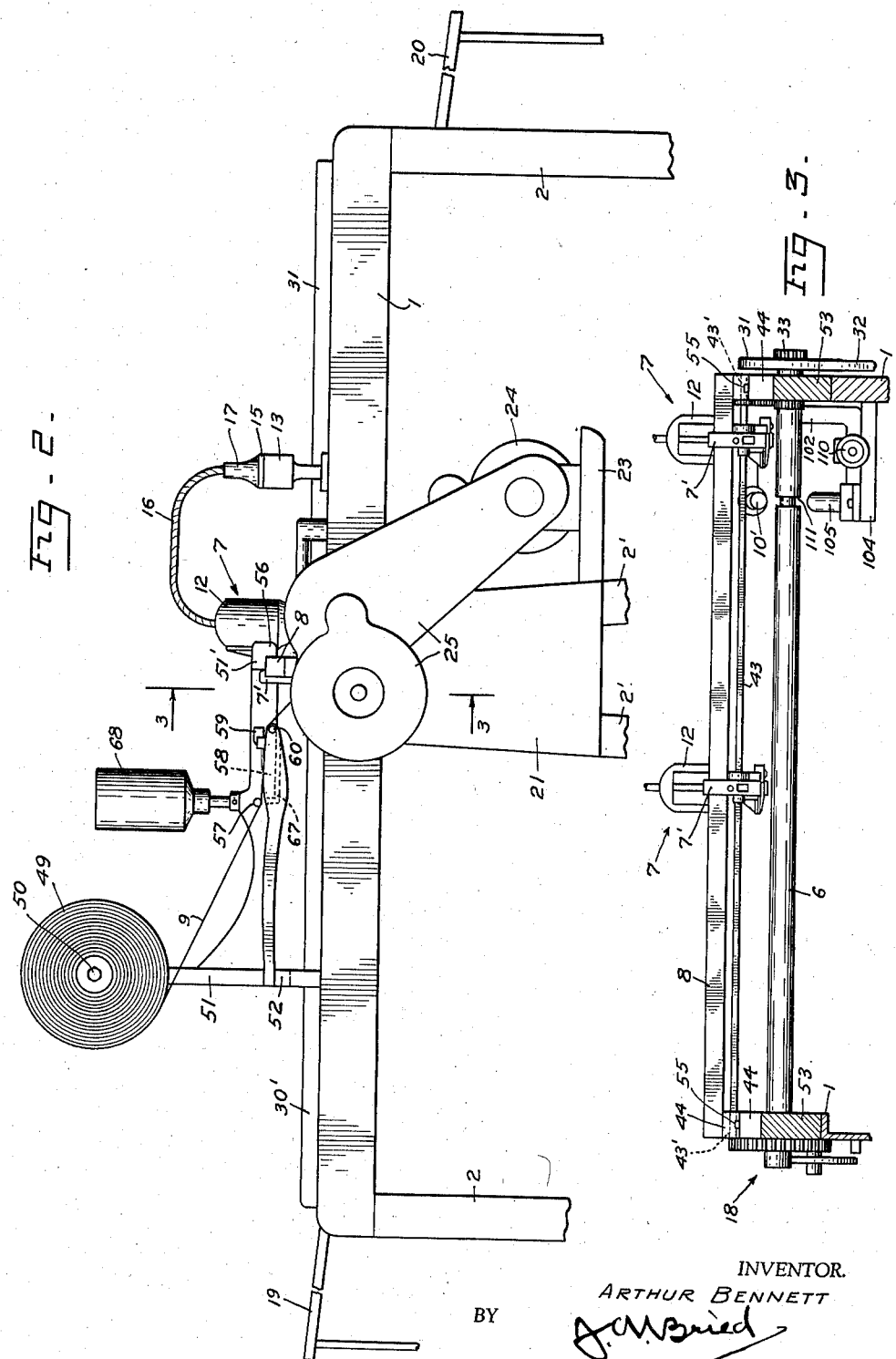
June 11, 1940.  A. BENNETT  2,203,977
AUTOMATIC TAPE-APPLYING MACHINE
Filed April 7, 1937   9 Sheets-Sheet 2
INVENTOR.
ARTHUR BENNETT
BY
ATTORNEY.

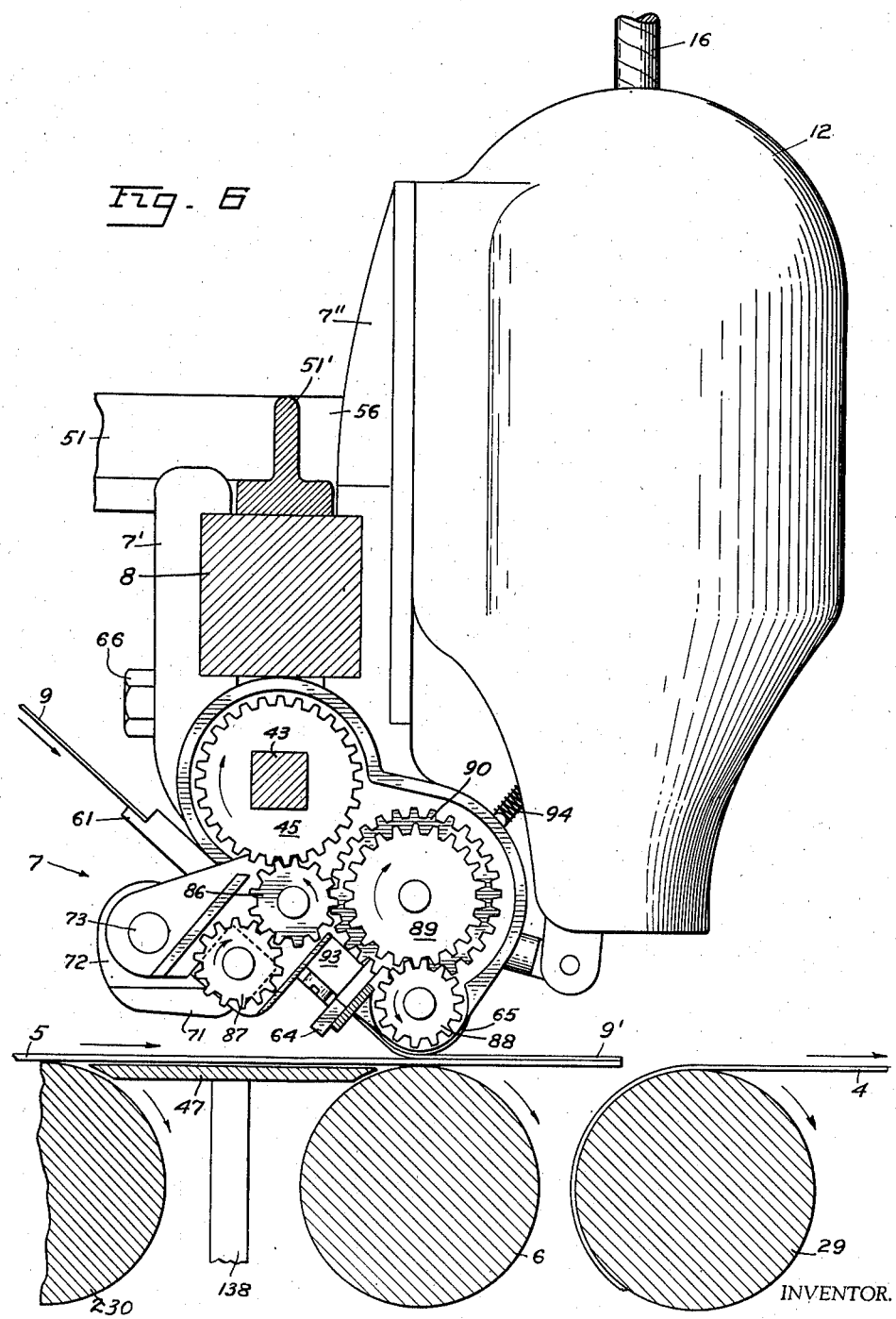

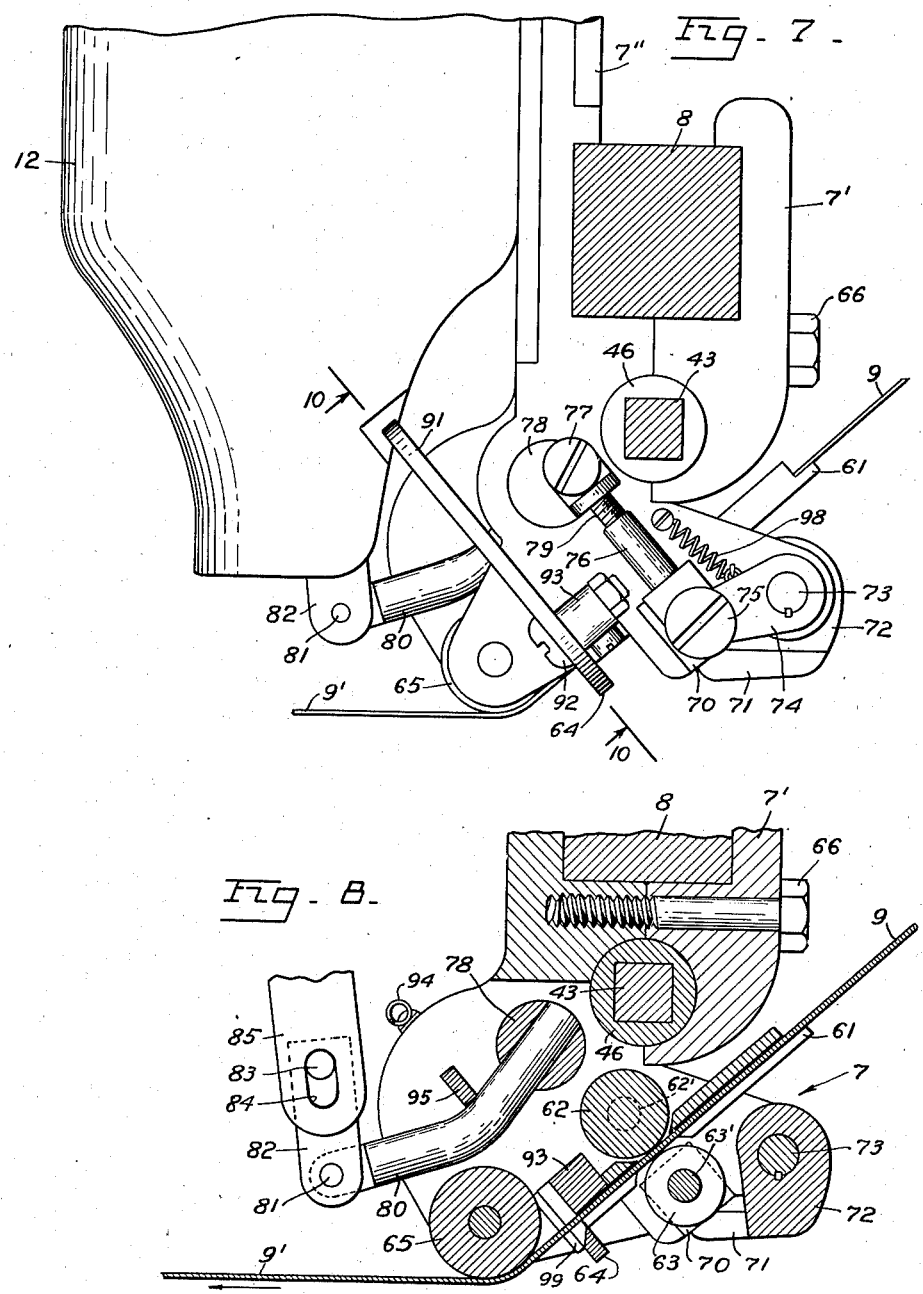

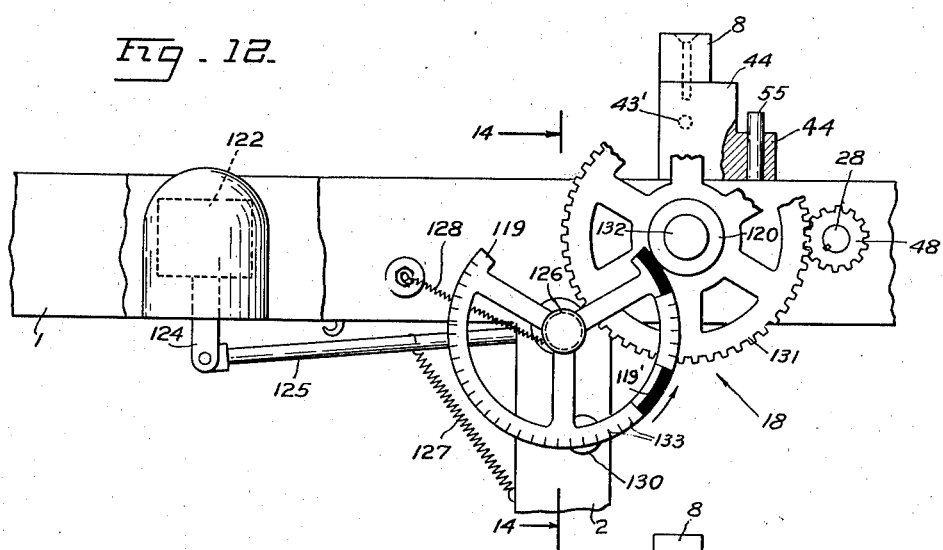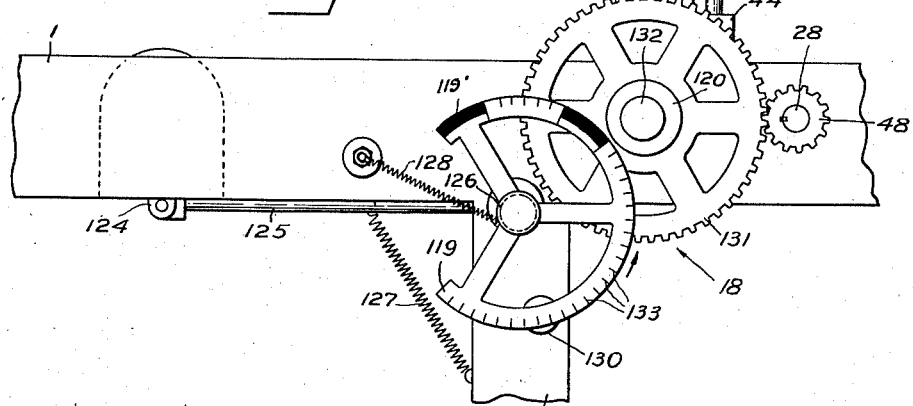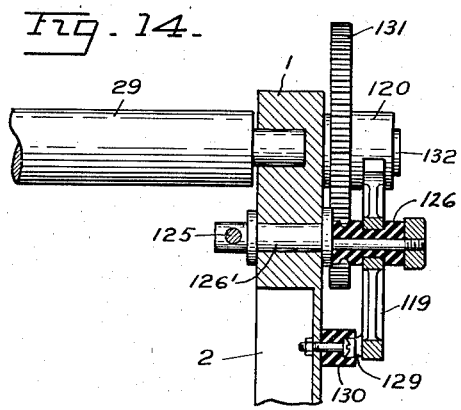

June 11, 1940.                A. BENNETT                    2,203,977
                    AUTOMATIC TAPE-APPLYING MACHINE
                        Filed April 7, 1937           9 Sheets-Sheet 8
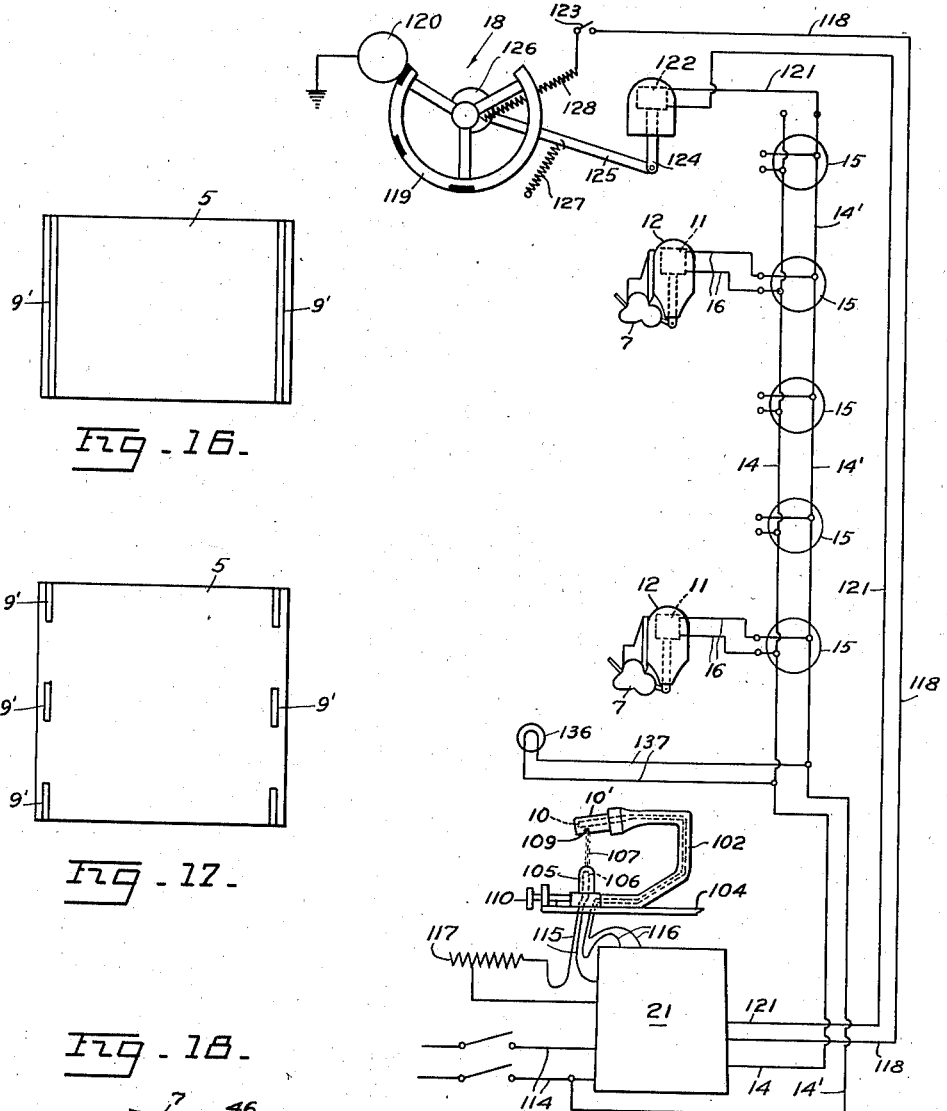
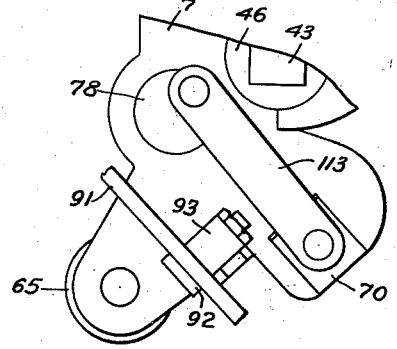
INVENTOR.
ARTHUR BENNETT
BY
ATTORNEY.

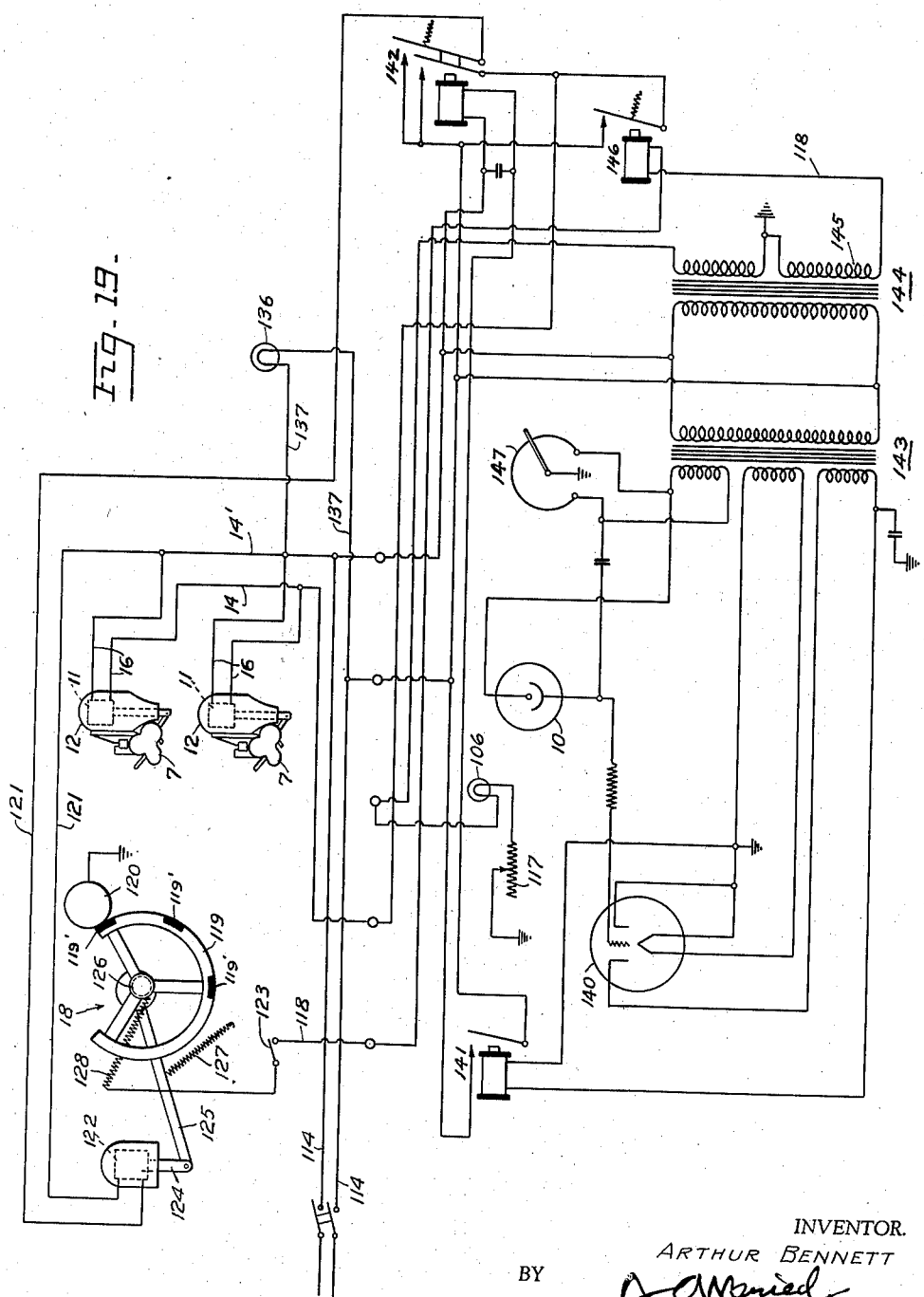

Patented June 11, 1940

2,203,977

UNITED STATES PATENT OFFICE 2,203,977

AUTOMATIC TAPE-APPLYING MACHINE

Arthur Bennett, San Francisco, Calif.

Application April 7, 1937, Serial No. 135,486

20 Claims. (Cl. 154—1)

This invention relates to the application of adhesive tape to the margins of printed sheets and the like for later use in suspending the sheets, such as generally described in my issued Patent No. 2,062,284, covering a manually operated machine for carrying out this work.

The principal object of the present invention is to provide an automatic machine for applying such strips of adhesive tape at greatly increased speed and in various manners to the sheets as may be desired.

Another object of the invention is to provide a machine of this kind which will apply any desired number of strips of the adhesive tape to a sheet of paper or cardboard spaced at any required points thereacross.

Another object is to provide means for interrupting the applications of tape in the various rows being applied so that a succession of short spaced lengths of tape in each row will result, or but a short strip of tape at the leading and final end of the sheet may be applied.

Another feature is means for adjusting or varying the exact point of cut-off of the tapes with respect to the leaving edge of the sheets being taped.

Another feature is such a machine which will accommodate any reasonable variation in thickness of sheets being handled all the way from thin paper to thick cardboard, without adjusting the mechanism and which will yield without injury to abnormal thickness of sheets or several sheets inadvertently run through.

Another feature is to provide an adjustable electric control for the tape applying elements, and still more specifically a photo-electric cell control for the start and stopping of the application of the tapes to each sheet passing through the machine.

Other objects and advantages of the invention will appear in the following description and accompanying drawings.

In the drawings:

Figure 1 is a plan view of the machine.

Figure 2 is a side elevation of the machine with the lower part of the frame supports broken away.

Figure 3 is a vertical cross section of the machine as seen from the line 3—3 of Figure 2.

Figure 6 is an enlarged side elevation of one of the tape applying units as seen from the line 6—6 of Figure 1, and with the forward side of the gear box removed to show the tape guiding and applying unit within.

Figure 7 is an elevation of the tape applying unit of Figure 6 as seen from the opposite side of that figure.

Figure 8 is a central vertical section of the tape applying unit as seen from the line 8—8 of Figure 9.

Figure 9 is a front elevation of the tape applying unit as seen from the arrow 9 of Figure 6.

Figure 10 is a section taken on the line 10—10 of Figure 7.

Figure 11 is an enlarged detail of the sliding spring-pressed block or bearings of the knurled tape gripping rolls.

Figure 12 is an enlarged side elevation of a portion of Figure 1 as seen from line 12—12 of Figure 1, and showing the tape interrupting mechanism.

Figure 13 is a view similar to that of Figure 12 showing the parts in different relation.

Figure 14 is a vertical section of Figure 12 taken along the line 14—14 thereof.

Figure 15 is a general diagrammatic drawing of the electric circuits and controlling devices which regulate the application and interruption of the tape being applied to the sheets.

Figure 16 is a plan view of a sheet of paper or cardboard showing strips of adhesive tape applied to opposite margins as performed by the machine.

Figure 17 is a plan view of a sheet of paper or cardboard showing a plurality of aligned short pieces of adhesive tape applied at intervals to opposite margins as performed by the machine.

Figure 18 shows a modification of a portion of Figure 7.

Figure 19 is the electrical wiring diagram.

Figure 4:
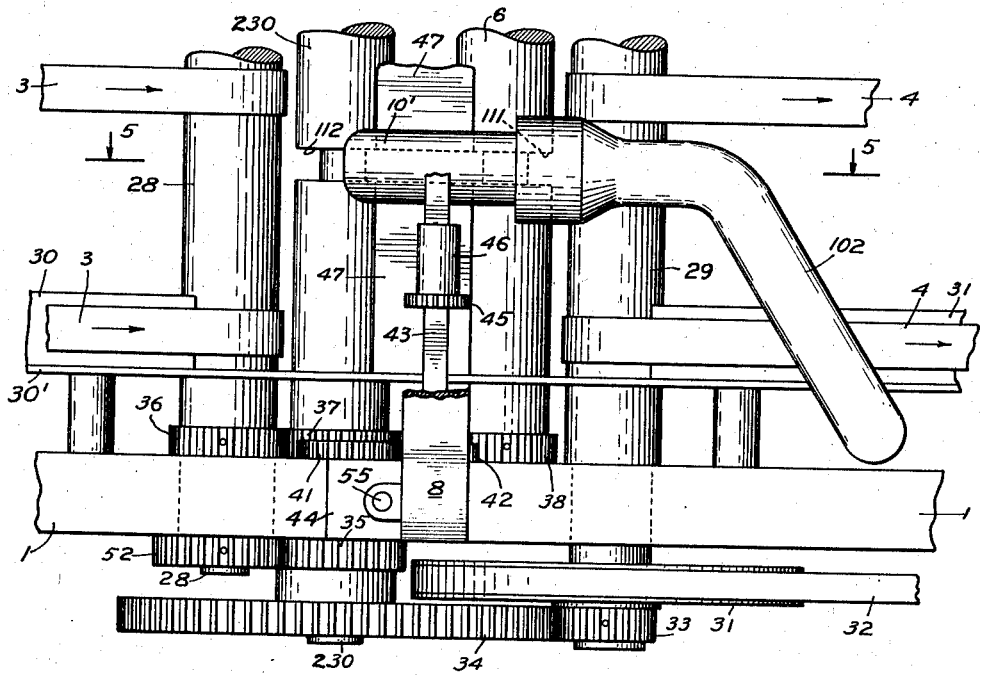
Figure 4 is an enlarged plan view of a portion of the machine, being the lower central portion of Figure 1 with gear casings and tape applying unit removed.

Briefly described, the invention comprises a frame 1 supporting a horizontal series of laterally spaced traveling belts 3 for receiving the sheets, and delivery belts 4, which carry the sheets of paper 5 to be taped, along at a rapid rate of speed over a supporting roll 6 and under any number of tape-applying units 7 adjustably supported on an overhead bar 8, and which units apply the adhesive tape 9 under control of a photo-electric cell 10 which intermittently operates a solenoid 11 enclosed in a casing 12 for starting the application of tape to the traveling sheet of paper and to cut the tape off at a predetermined interval. The interruption of the photo cell light beam by the traveling sheet of paper releases the solenoid for operating of the units by gravity and spring power.

The machine has a cross bar 13 supporting electric circuit wires 14 (see wiring diagram) with a row of outlet sockets 15 along it into any of which a tape applying unit solenoid circuit may be plugged as by wires 16 in a flexible armored conduit 16' and plug 17. Besides the above general features, the machine is provided with a solenoid current interrupting device which makes it operate at any desired interval independent of the interruption of the photo cell light beam from passing sheets of paper. This feature makes it possible to apply successive spaced strips or small pieces of tape at intervals along the sheets of paper passing through the machine, and it consists generally of an electric contact segment wheel driven by the machine and provided with adjustments for any contact interval desired. This feature is generally designated 18 on the drawings.

The sheets of paper to be taped are usually printed advertising signs and posters which are generally intended for later hanging up or sticking to show windows, and walls of stores, by means of the adhesive strips of tape applied thereto by the machine. The adhesive tape used is preferably of a kind permitting stripping of the tape proper from the sheet, at such time as it is desired to apply the sheet to a show window; so as to leave a layer of ever tacky gum which will adhere to the desired supporting surface when the sheet is pressed against it at the points where the gum is left upon it. The machine will, of course, apply any other kind of adhesive tape to the sheets.

With the above general features, operation and use of the machine in mind, the detailed description to follow will be more easily followed:

The frame 1 of the machine is preferably horizontally arranged and provided with legs 2 supporting it a convenient height from the floor for feeding by an operative, and is shown with a feeding table or board 19 at one end and a delivery board 20 at the other.

Centrally disposed legs 2' support a casing 21 in which is housed the photo-electric cell amplifying set, and also carry at bracket 23 on which is a driving motor 24 which drives the machine.

In Figure 2 the driving belt and gears to the live rolls which actuate the receiving and delivery belts as well as the tape applying mechanism, are shown covered with a sheet metal casing 25, but which is omitted in Figure 4 where some of these parts may be seen, and others in Figure 3.

Figure 5:
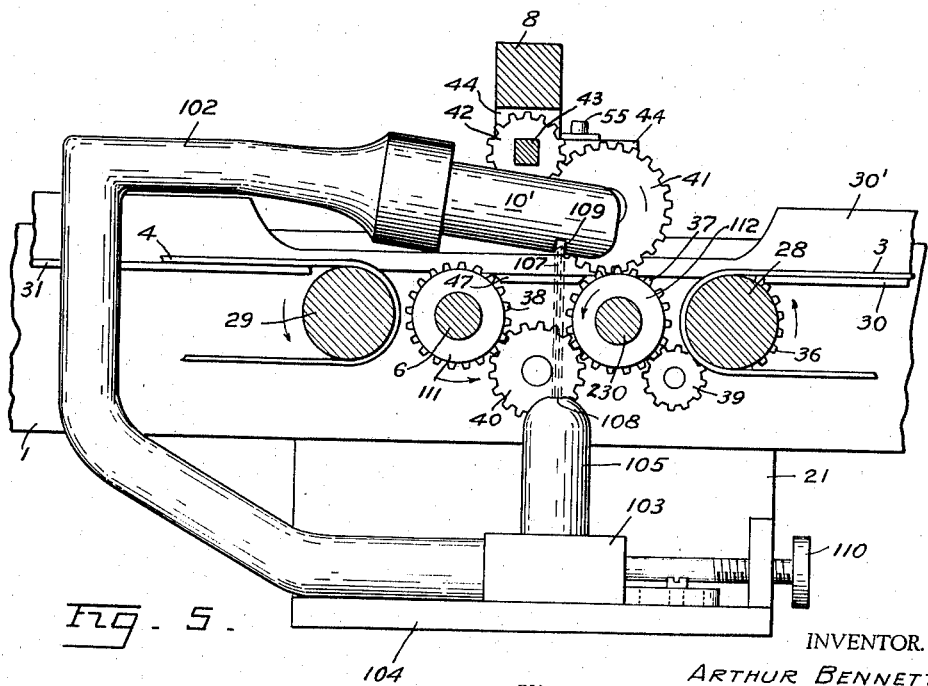
Figure 5 is a vertical section on line 5—5 of Figure 4.

The receiving and delivery belts 3 and 4 are loops supported at the ends respectively on idler end rolls 26 and 27 and live or driving rolls 28 and 29, and intermediate those points may be supported along the straight upper runs as by angle iron members as shown for the first belt at 30 and 31 and whereof the upwardly extending leg 30' of angle iron 30 serves as a side guide against which the side edges of the sheets are fed from table 19. It should be noted that in Figure 5 the position of live rolls 28 and 29 is reversed from that of Figures 1 and 4, as Figure 5 is turned around on account of looking in the direction of the arrows 5—5 of Figure 4.

Live rolls 28 and 29 are spaced quite a distance apart and positioned between them are two other driven rolls 6 and 230. The rolls are all revolvably supported in suitable bearings 53 carried by the frame. Secured to the end of roll 29 is a grooved pulley 31 driven from the motor 24 by a chain or preferably a V belt 32. At the outer end of roll 29 is secured a spur pinion gear 33 meshing with a relatively large spur gear 34 which together with a pinion 35 as a unit is idly mounted on the end of roll 230 with the pinon 35 in mesh with a pinion 52 secured to the outer end of roll 28. Secured to the rolls 28, 230 and 6, at the inner side of frame 1, are spur pinions 36, 37 and 38 in turn meshing with idler pinions 39, 40, so that the rolls all revolve in the same direction.

Pinion gear 37 of roll 230 also meshes an idler gear 41 which in turn meshes with a pinion 42 secured to a small square or spline shaft 43 which passes across the machine under fixed bar 8 and is revolvably supported at its end 43' in brackets 44, while slidably mounted on square shaft 43 are several small pinions 45 with hubs 46, there being as many of these floating pinions as there are tape appling units or the maximum number of rows or strips of tape the machine was designed to apply simultaneously to the sheets passing through.

By the arrangement described all four rolls and square shaft 43 are driven in unison, but roll 29 at a higher speed so that the delivery or take-off belts 4 will quickly carry away the sheets after the tape is applied. To bridge the passage of the traveling sheets of paper from roll 230 to roll 6 which are separated quite a distance, a fixed bridge plate 47 is provided and which is suitably supported at spaced points by brackets below, shown at 138. The remote end of roll 28 carries a driving gear or pinion 48 for driving the tape interrupting mechanism 18 to be later described.

An important feature of parts just described is that idler gear 41, square shaft 43 and large square supporting bar 8 are carried as a separate unit on end brackets or blocks 44 which rest loosely upon the top of frame 1 and are free to rise and fall thereon, guided by upwardly projecting pins 55 secured to the frame 1. This is to permit the square supporting bar 8 together with all taping units it may be carrying to rise in case any abnormally thick material is accidentally passed through the machine, ordinary variations in thickness of stock requiring no lifting of this bar as a sufficient space to take care of all regular thicknesses of stock is provided.

For each strip of tape desired on the sheets being run through the machine a supply roll 49 of tape is used, two such rolls being shown on Figure 1 of the drawings. These rolls are each revolvably carried on a spindle 50 in turn carried by a bracket 51 which is adjustably supported at end end by a bar 52 extending across the machine frame, while at the forward end bracket 51 is extended at right angles as at 51' and supported on top of bar 8 between the clamping portions 7' of the tape applying units 7, the extreme end of bracket 51 being formed to overlap the edge of bar 8 as indicated at 56.

The tape 9 from roll 49 passes downward and under a guiding roller 57, thence over a moistening pad or brush indicated at 58, through a suitable back-stop device 59 to prevent retraction of the tape and over another roller 60, thence downwardly at an angle to a margin guiding member 61 of the tape applying unit 7 and which guide directs the tape between the tape gripping rollers 62, 63, past the tape cutter 64 and around the applicator roll 65 which functions to lay the tape sticky side down as at 9', upon the advancing sheet of paper 5 going through the machine, all as best shown in Figures 6 and 8.

The moistening pad or brush 58 is located in a suitable well 67 and kept moist with a suitable liquid (usually gasoline for the ever tacky type of tape under consideration) from an inverted supply can 68 operating on the principle of a fowl's drink fountain.

The tape applying unit comprises a hollow body 7 having the elements just enumerated and it is provided with clamp members 7' engaging over supporting bar 8 so that it may be slid to any point therealong and firmly clamped in place by a bolt or thumb screw 66.

Rollers 62, 63 and 65 are preferably knurled on their surfaces to better grip the tape and roller 63 is formed with a gap 69 (see Figure 10) to straddle the sticky gum layer 9" on the face of the tape. Rollers 62 and 65 are revolvably mounted on fixed axis in the body 7, while roller 63 is revolvably mounted in a pair of sliding boxes 70 for movement to and from the tape through the action of a crank arm 71 of a crank 72 secured to a revolvable shaft 73 which shaft has secured to it at one end another crank 74 pivoted at its end at 75 to a link 76 in turn pivoted at its opposite end at 77 eccentrically to a larger shaft 78 revolvably supported in body 7.

Link 76 is preferably adjustable in length as by tubular telescopic construction threadedly connected as at 79, and shaft 78 is provided with a bent crank arm 80 rigidly secured at one end to it and pivoted at its other end at 81 to a link 82 in turn pivoted at 83 in a slot 84 in the lower end 85 of an extension from the movable core of solenoid 11 so that upon the solenoid core rising or falling the loose connection due to the pin and slot 84, 85, will give a starting shock to the cutter blade in cutting the tape.

Rollers 62 and 63 are directly geared together as by gears 86, 87, and gear 86 is driven continually by gear 45 of hub 46 which floats on square shaft 43, while roller 65 has a gear 88 meshing with an intermediate gear 89 rotatable with a somewhat larger gear 90 in turn driven by gear 86. Roller 65 is of larger diameter than its gear 88 to prevent the latter from touching the sheets being gummed, but the gear arrangement described gives all of the rollers the same surface speed.

The tape cutter or blade 64 which extends across the path of the tape just above the tape applicator roll 65 is formed on a flat plate 91 pivoted at 92 to a fixed post 93 on the body 7 and is normally urged by a coiled tension spring 94 to swing away from the tape, while an arm 95 on the plate extends across the path of crank 80 so that when the solenoid core is drawn up by energizing of the solenoid, arm 95 will be quickly raised to also raise the cutter blade 64 and chop the tape off from below. Blade 64 works as a shear against the edge of a fixed shear block 93 positioned just above the tape, and is supported in proper relation to the shear block by a guiding plate 99 which overlaps the outer side of the blade and is secured to the frame or body 7 as by a bolt 100. Sliding boxes 70 are normally urged downward (to release gripper roller 63) by light springs 97 shown in Figure 11, and wherein the reduced bearing portions of rollers 62 and 63 respectively are indicated at 62' and 63'. Light springs 97 are only to insure backing out of sliding blocks 70 when same are released by outward moving of crank arm 71, but which crank arm through its connected mechanism is normally urged upwardly by the weight of the solenoid core (when solenoid is de-energized) and assisted in this by the pull back spring 94 of the cutter, as well as by another coiled tension spring 98 which is anchored at its upper end to unit body 7 and hooked at its lower end to crank 74.

The taping unit driving gear 45 which is slidable along square driving shaft permits the unit to be placed and clamped anywhere along the supporting bar 8, and the gear is retained in place within the unit by part of a split casing 10, which is attached to one of the members 7' and is recessed within to embrace opposite sides of the gear.

The operating solenoid 11 for the taping unit is mounted within a casing 12 which is suitably secured to an extension 7" of body 7 to make it a substantial part of the same, and the flexible conduit 16' of the solenoid circuit wires permits plugging the unit into any of the sockets 15.

In the operation of the taping unit the rollers are all in constant motion during the operation of the machine, but when the solenoid 11 is energized it lifts link 82 and crank 80 to turn eccentric shaft 78 and swing crank 71 outward from sliding boxes 70 so that gripper roller 63 is released from the tape and the tape stops instantly. At a moment after the gripper roller is released the cutter blade 64 is operated to chop off the tape so that the passing sheet carried it away. It is not required that applicator roller 65 force the tape against the sheet, as the tape is falling very fast upon the moving sheet and is extremely tacky so that it adheres at once, and as the sheets finally pile up one on top of the other they are sufficiently pressed to the tape.

Instead of the eccentric shaft 78 operating through crank 74 to raise and lower crank 71 to raise and lower the sliding boxes, the eccentric may be directly linked to the boxes as by a link 113 as shown in Figure 18, and thus positively force the boxes up and down. In this case a link 113 should be at both ends of the eccentric shaft 78.

The normal starting and stopping of the taping unit, or rather the de-energizing and energizing of its solenoid 11 is preferably accomplished by means of a light beam which operates a photo-electric cell controlling the solenoid circuit so that if the light beam is interrupted the solenoid circuit is broken and vice versa, and which interruption is effected by the passing sheets being taped.

The photo-electric cell and its light source are mounted as a unit for adjustment back and forth relative to the advance or leaving edge of the traveling sheets, and the unit consists of the photo-electric cell 10 enclosed in a shield 10' which is secured to one end of a rigid U-shaped hollow arm 102, a base block 103 supported on a bracket or shelf 104 and projecting upwardly from which base 103 is a cylindrical light guard 105 enclosing an electric lamp 106, the rays 107 of which are projected upward out of a small hole 108 in the upper end of the guard to enter a slot 109 in photo-cell shield 10' to impinge the cell element.

Base block 103 is slidably secured to support 104 and provided with hand-screw adjusting means 110 so that it may be adjusted longitudinally of the machine, and to provide a clear path for the light ray in all positions of adjustment, rolls 6 and 230 are slotted as at 111 and 112 respectively, and bridge plate 47 is also cut away in line with the roll slats so that a considerable space exists along which the ray may be adjusted.

The photo-electric cell circuit is of the well known type in which the cell current operates a vacuum tube amplifier 140 and the amplified current actuates various relay switches 141, 142 to energize and de-energize the tape applying unit solenoid, or solenoids if several of the units are used in laying several strips of tape on the sheets, when the light ray is interrupted by the passing sheets, and also the interrupting mechanism 18 which acts to stop the application of tape intermittently while the sheet is still intercepting the ray.

The photo-cell amplifying and relay set operates from the house current, usually 110 A. C. and may incorporate any desired transformers 143, 144, for producing any lower voltage operating currents for any purpose, such for instance as a 6 volt current as found desirable for the ray-producing lamp 106, and an 18 volt current for the interrupting mechanism 18.

Since such photo-electric cell amplifying and relay sets may vary considerably and include quite a variety of specific electrical elements, and are quite standardized (such for instance as the General Electric Company's photo-electric relay set #CR 7505–K1) detailed description of its elements is not thought necessary here, as it is not specifically claimed and the description will therefore be confined to the main elements and particular arrangement of operating current circuits as generally shown on the diagrammatic drawing, Figure 15.

In the diagram 114 is the line current, 21 is the casing of the set referred to, delivering about a six volt current in wires 115 to lamp 106 to produce the operating ray 107 which is directed into the slot 109 of casing 10' to impinge the photoelectric cell 10, the circuit wires 116 of which enter the set to operate its amplifying tube 140. Wires 115 and 116 are slack to permit bodily adjustment of the photo-electric cell and lamp mounting 102, 103, by the hand screw 110. Lamp circuit 115 is provided with an adjustable rheostat 117 for varying the intensity of the operating ray and which is very important as will later appear.

The wires 14 of plug-in sockets 15 for the taping unit solenoids 11 are energized by a 110 volt circuit, one of the wires of which passes into the set 21 to a relay switch for making and breaking of its circuit directly as the photo-electric cell circuit is made and broken so as to de-energize the solenoids 11 of the tape applying units 7 and start the application of the tape the instant the leading edge of sheet 5 enters and intercepts the ray 107 and stop it the moment the final end of the sheet passes and re-establishes the ray.

Another circuit is provided by the set, of say about eighteen volts which passes through wire 118 through insulatingly mounted segment wheels 119 to hub 120 where it may be grounded or returned to its grounded transformer source, 145 in the set, or separately returned, and this circuit when closed between wheel segment 119 and hub 120 operates a suitable relay 146 in the set to close circuit 14 (independently of the photo-electric cell control) and thereby interrupt the laying of the tape even while the paper sheet 5 is interrupting the ray and breaking the photo-electric cell current. This is for applying spaced short pieces of tape.

An extension 121 of the hot side 14' of circuit 14, energizes a solenoid 122 when its circuit is closed to raise its core 124 and pull upward on a lever 125 to slightly revolve an eccentric 126 on which segment wheel 119 is rotatably mounted and move it away from contact with hub 120, whereas when the solenoid 122 is de-energized its core and lever 125 falls, assisted somewhat by a small tension spring 127 and resiliently forces the wheel 119 to contact hub 120.

The circuit to solenoid 122 is closed and broken only with the making and breaking of the light ray 107 by the passing sheets of paper, through means of a suitable relay 142 in the controlling set under control of the ray current.

Low voltage circuit wire 118 is electrically connected to the hub of segment wheel 119 by a tension spring 128 which slowly winds about the hub as the wheel turns when in frictional driving contact with driving hub 120 (which is always in motion while the machine is running), and when this frictional contact is broken by the energizing of solenoid 122 and pulling the wheel 119 away from hub 120, spring 128 revolves the wheel in reverse direction to starting point shown in Figure 15.

When electrical contact is made between segment wheel 119 and hub 120, the circuit established in wire 118 at once operates a suitable relay in set 21 to close the circuit to the taping unit solenoids 11 and thus stop the application of tape while the paper sheet continues to travel. Therefore, by providing an intermittent contact between wheel 119 and hub 120, a series of spaced pieces of tape will be applied by units 7.

To accomplish the intermittent breaking of circuit 118 I may provide any means of insulating various portions of the rim of wheel 119 either by coating with an insulating varnish such portions 119' as are desired to be insulated, or pasting thin strips of Celluloid or paper across the rim, any such insulated areas will of course represent a place on the sheet where tape will be applied, and the bare portions will represent an absence of tape as the taping units would then be inactive on account of the energizing of their solenoids 11. By opening switch 123 the interrupter circuit will be opened and this device rendered ineffectual to interrupt the tape, and hence the strips laid on the sheets will be substantially as long the the sheets.

It is obvious that instead of using switch 123, lever 125 could be manually raised and latched to thereby separate wheel 119 from hub 120, and thus also render the interrupter inoperative.

It will be evident from the above that the effective circumference of wheel 119, as it rolls on revolving hub 120, must take care of the longest sheet passing through the machine so as to make it possible to space a series of short pieces of tape along it, or a short strip at the leading and leaving edge of the sheet. This is accomplished by the construction shown in Figures 12 to 14, and wherein the eccentric 126 upon which wheel 119 is rotatably mounted is of insulating material, secured to a metal shaft portion 126' which is rotatably supported in the machine frame 1 and to which shaft portion operating lever 125 is secured.

The wheel, when free, is turned to the right (clockwise) by spring 127 to starting position shown in Figure 12, and is stopped from further rotation in that direction by a stop pin or lug 129 which strikes a stop block 130 of insulated material secured to the machine.

Hub 120 is secured to or part of a relatively large gear 131 which is revolvably supported on a stub shaft 132 projecting from the side of the machine, and gear 131 is in mesh with pinion 48 which is secured to roll 28.

The relation of gear sizes and diameter of hub 120 is such that for every one inch of travel of the surface of roll 28 (and of course the same for the paper sheets being taped) the surface of hub 120 will travel but one-quarter inch, and hence the total length of the rim of wheel 119 is graduated off in quarter inches as indicated (at 133 in Figures 12 and 13) and is of a total length equal to one-quarter the length of the longest sheet to be run through the machine.

In Figures 12 and 13 the shaded portions 134 of the wheel rim are those covered with insulating varnish or other material.

The return spring 128 of wheel 119, since it is also an electric conductor, is shown anchored at one end to switch 123 which is insulatingly mounted on the machine frame 1 and from which switch the wire extends at 118 to the controlling set 21 as shown in Figure 15.

Since the set 21 contains an amplifying tube 140 which requires time to heat up before it will respond to the photoelectric tube current and operate the relay which closes the taping unit solenoid 11, I provide a small signal lamp 136 at a convenient point on the machine and which is on a circuit 137 in parallel with the solenoid circuit so as to give an indication when the machine is ready to go. Figure 19 shows the details of the circuits described above.

In operation, the power line switch is closed, and after the signal lamp 136 indicates the photoelectric relay set is ready, the motor of the machine is switched on and the sheets are fed through one after the other with righ-hand margins aligned against guide 30', and while ordinarily the breaking or interruption of the ray 107 by the sheet 5 and re-establishing of the ray at termination of the sheet will cause the operation of the taping units as described, I have discovered that a photo-electric cell controlled mechanism is released almost instantly upon interruption of the operating ray regardless of the intensity of the ray, but that the converse of this is not true as it takes an appreciable time to build up or re-establish the action of the cell upon re-establishing the ray, and which is shorter the more intense or active the ray is.

This fact makes it possible with a given setting of the light and cell bracket 102 to vary the exact relation of the final end of the tape with respect to the final end of the traveling sheet very materially, all depending on the speed of travel of the sheet and tape, or what may be termed the work elements controlled by the ray. This is apart from the control of the general sensitiveness of the cell both in starting and stopping as controlled by a potentiometer generally provided with photo-electric controlled sets and as indicated at 147 in the wiring diagram.

In order to apply the above discovery to advantage in my machine, I therefore provide the adjustable rheostat 117 on the lamp circuit for controlling the brilliancy of the ray 107. This, taken with the bodily adjustability of the photo-electric cell unit 102 gives perfect control of the positions of the tapes even under high speed travel of the sheets, so that the capacity of the machine is very great.

Besides the mechanical construction described, the machine is provided with the usual accessories found in printing presses and other machines handling rapidly moving sheets of paper, such as belt tighteners and aligning pulleys for the receiving belts; hold down rollers, guides or wires for the sheets, etc., but as all such artifices are well known and form no part of the claims appended hereto, they are omitted from the drawings and detailed description to avoid unnecessarily lengthening it.

Having thus described my invention and the manner of its operation, what I claim is:

1. A machine for applying gum tape to paper and other sheets comprising conveying means for passing the sheets successively through the machine, electrically operated cooperating devices arranged and adapted for guiding and feeding adhesive tape onto said sheets while passing and for cutting off the tape, and means including a lamp providing a light ray across which the sheets pass and a photo-electric cell operated by said ray controlling an electric circuit for the starting of and the stopping of the tape feeding device and the operation of the cutter respectively as the edges of the sheets enter and leave the path of said ray.

2. A machine as set out in claim 1 in which a plurality of said cooperating devices are spaced across the path of travel of said sheets, and means is provided for connecting said devices together for simultaneous operation as set out all under the control of said ray.

3. A machine as set out in claim 1 wherein means is provided independent of said light ray stopping and starting the application of the tape at a predetermined point between the forward and rearmost edge of each sheet so as to leave a gap in the application of the tape to the sheets at said point.

4. A machine as set out in claim 1 wherein means is provided independent of said light ray stopping and starting the application of the tape at a plurality of predetermined points between the forward and rearmost edge of each sheet so as to leave gaps in the application of the tape to the sheets at said points.

5. A machine for applying gum tape to paper and other sheets comprising conveying means for passing the sheets successively through the machine, a support extending transversely across and above the path of the traveling sheets, electrically operated cooperating devices arranged and adapted for guiding and feeding adhesive tape onto said sheets while passing and for cutting off the tape-mounted on said support in a manner for adjustment therealong to various positions across said path, and means including a lamp providing a light ray across which said sheets pass and a photo-electric cell operated by said ray controlling the starting of and the stopping of the tape feeding device and the operation of the cutter respectively as the edges of the sheets enter and leave the path of said ray.

6. A machine as set out in claim 5 in which a plurality of said cooperating devices are adjustably spaced along said support, and means is provided for connecting them together for simultaneous operation as set out all under the control of said ray.

7. A machine for applying gum tape to paper and other sheets comprising conveying means for passing the sheets through the machine, a support extending transversely across and above the path of the traveling sheets, associated devices for feeding adhesive tape onto said sheets and for severing the tape mounted on said support and adjustable to various positions therealong across said path, means actuated by the leading and leaving edges of said sheets respectively controlling the start and stopping of said associated devices, and means for selectively interrupting the tape feeding device and operating the severing device at points between the leading and leaving edges of the sheets.

8. A machine for applying gum tape to paper and other sheets, comprising conveying means for passing the sheets through the machine, taping means operated in unison with the conveying means guiding and feeding a strip of tape to the sheets as they pass along, a cutter arranged for cutting off the tape, electrically operated means for operating said cutter and stop the feeding of said tape at the leaving edge of the sheet, and means for operating said last mentioned means at predetermined points across said sheet.

9. A machine for applying gum tape to paper and other sheets comprising conveying means for passing the sheets through the machine, taping means operated in unison with the conveying means guiding and feeding a strip of tape to the sheets as they pass along, a cutter arranged for cutting off the tape, electrically operated means for operating said cutter and stop the feeding of said tape at the leaving edge of the sheet, a revolving gage on said machine, an electric circuit controlled by said gage, means for closing and operating said circuit at desired points along said gage for operating said last mentioned means.

10. A machine for applying gum tape to paper and other sheets comprising conveying means for passing the sheets through the machine, taping means operated in unison with the conveying means guiding and feeding a strip of tape to the sheets as they pass along, a cutter arranged for cutting off the tape, electrically operated means for operating said cutter and stop the feeding of said tape at the leaving edge of the sheet, a revolving gage on said machine, an electric circuit controlled by said gage, means for closing and operating said circuit at desired points along said gage for operating said last mentioned means, and means for rendering said gage ineffective when desired.

11. In a machine as specified in claim 9, said gage comprising a wheel with a rim forming an electric conductor of said circuit, a revolving roller against which said rim revolves forming a continuation of said circuit, and means for insulating said rim at points therealong.

12. In a machine as specified in claim 9, said gage comprising a wheel with a rim forming one electric conductor of said circuit, a revolving roller against which said rim revolves forming a continuation of said circuit, and means for separating said rim from said roller.

13. A machine as set out in claim 5 in which a plurality of said cooperating devices are adjustably spaced along said support, a row of spaced electric sockets is supported over and across the path of the sheets and to which sockets the operating circuit for said device is wired, and a flexible electric connection from each of said devices is provided for plugging into said sockets selectively.

14. A machine for applying gum tape to paper and other sheets, comprising conveying means for receiving the sheets and passing them through the machine, means providing a light ray in the path of the passing sheets for interruption thereby, means guiding a strip of tape to the sheets as they pass through the machine, and means controlled by said light ray starting and stopping the application of tape to said sheets respectively as they enter and leave the path of said ray, the last mentioned means including a photo electric cell on which said ray impinges, and means for varying the intensity of said ray to thereby control the position of the end of the tape relative to the sheet.

15. In a machine as specified in claim 1, a frame on which said photo electric cell and its light source are mounted in spaced relation with a path for the sheets between them, and means for movably adjusting said frame as a unit along the path of travel of said sheets.

16. A machine for applying gum tape to paper and other sheets, comprising conveyor means for passing the sheets in succession through the machine, a taping unit operated in unison with the conveyor guiding and feeding a strip of adhesive tape onto the sheets as they pass along, a cutter carried on said unit arranged for cutting off the tape, a supporting bar extending transversely across the path of and over the sheets as they pass along, said taping unit with said cutter mounted on said bar for adjustment to various positions therealong adjacent said sheets, and means mounting said bar with freedom for bodily rising with said taping unit to permit the passing of a plurality of superimposed sheets accidentally passing at one time under said unit.

17. A machine for applying gum tape to paper and other sheets, comprising conveyor means for passing the sheets in succession through the machine, a taping unit operated in unison with the conveyor guiding and feeding a strip of adhesive tape onto the sheets as they pass along, a cutter carried on said unit arranged for cutting off the tape, and means mounting said taping unit above and adjacent the path of the passing sheets in a manner with freedom for bodily rising to permit the passing of a plurality of superimposed sheets accidentally passing at one time under said unit.

18. In a machine for applying strips of gum tape to moving paper and other sheets, conveyor means for moving the sheets successively through the machine, means supporting a roll of the tape, a taping unit provided with tape gripping rollers arranged to draw the tape from said roll for application to the sheets as they pass along, mechanical power transmitting means positively connecting said gripping rollers for continuous rotation with and as the conveyor means operates, an electrically operated release normally effective to release said rolls from gripping action on the tape when no sheet is in position for taping, and means actuated by each sheet as it comes to position for rendering said release ineffective during the passage of the sheet only.

19. In a machine for applying strips of gum tape to moving paper and other sheets, conveyor means for moving the sheets successively through the machine, means supporting a roll of the tape, a taping unit provided with tape gripping rollers arranged to draw the tape from said roll for application to the sheets as they pass along, mechanical power transmitting means positively connecting said gripping rollers for continuous rotation with and as the conveyor means operates, an electrically operated release normally effective to release said rolls from gripping action on the tape when no sheet is in position for taping, means actuated by each sheet as it comes to position for rendering said release ineffective during the passage of the sheet only, and means actuated in synchronism with the advancement of a sheet through the machine for reestablishing the effectiveness of said release at various predetermined intervals between the leading and leaving end of each sheet.

20. In a machine for applying strips of gum tape to moving paper and other sheets, conveyor means for moving the sheets successively through the machine, means supporting a roll of the tape, a taping unit provided with tape gripping rollers arranged to draw the tape from said roll for application to the sheets as they pass along, mechanical power transmitting means positively connecting said gripping rollers for continuous rotation with and as the conveyor means operates, an electrically operated release normally effective to release said rolls from gripping action on the tape when no sheet is in position for taping, means actuated by each sheet as it comes to position for rendering said release ineffective during the passage of the sheet only, means actuated in synchronism with the advancement of a sheet through the machine for re-establishing the effectiveness of said release at various predetermined intervals between the leading and leaving end of each sheet, and means cutting off the tape at points just prior to re-establishing said release.

ARTHUR BENNETT.